Figure 1:
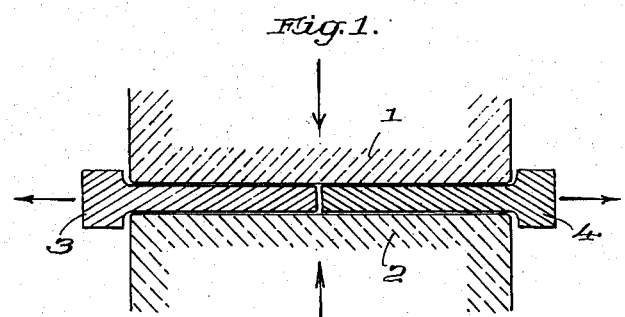

Oct. 23, 1945.　　　J. CÜSTERS　　　2,387,566
APPARATUS FOR CONNECTING PLIES OF THERMOPLASTIC MATERIAL
Filed May 3, 1941　　　2 Sheets-Sheet 1

Inventor:
Jakob Cüsters
By Mason & Porter
Attorneys

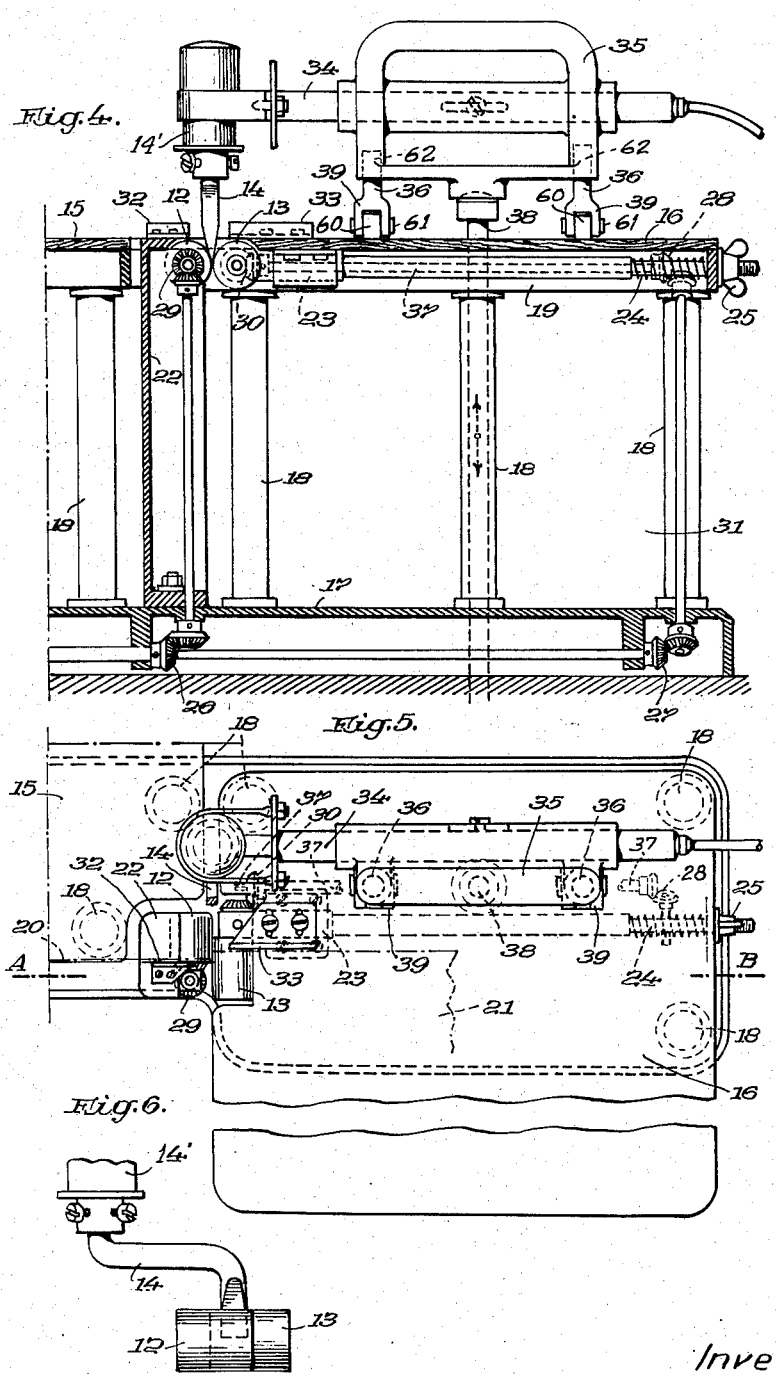

Patented Oct. 23, 1945

2,387,566

UNITED STATES PATENT OFFICE 2,387,566

APPARATUS FOR CONNECTING PLIES OF THERMOPLASTIC MATERIAL

Jakob Cüsters, Gladbach-Rheydt, Germany; vested in the Alien Property Custodian

Application May 3, 1941, Serial No. 391,802
In Germany August 22, 1940

3 Claims. (Cl. 154—42)

This invention relates to the working of certain thermoplastic artificial materials consisting of mixed polymerizates, particularly vinyl ester resins.

It is known that such artificial materials may serve to produce not only all sorts of articles, such as rods, plates, tubes, or the like, but also flexible rubber-like pieces of sheet material which are suitable for making clothes of every description as well as other articles which are usually made of such sheet material.

In the first place, the invention is the result of experiments made to overcome the difficulties which arose in forming seams or hems when assembling such thin pieces of sheet material into clothes or other desired articles. Naturally, it was first tried to employ the seam forming means used, for example, in the manufacture of mackintoshes, where the overlapping cloth edges are stuck or sewn together. Both methods were unsatisfactory, inasmuch as the connections were not durable. The stuck portions come off and are difficult to repair without spoiling the appearance of the respective article. When sewn together, the sewing-threads will either tear, or they will cut the material.

It is known that said thermoplastic artificial materials are capable of being welded. This weldability has already been made use of, for example for welding receptacles, tubes, and other technical articles consisting of these artificial materials. For this purpose, butt welding with the aid of a welding rod was preferably applied, the softening of the surfaces to be joined together having been effected by means of a flame or a hot air current. These welding methods were substantially the same as those used in metal welding.

It has been found that for forming seams or hems at the edges of cloth strips made of thermoplastic substances, these welding methods will not suit the purpose in consequence of the peculiar properties of these materials. Whereas most welding methods for connecting the adjoining surfaces consist in heating the plates or sheets overlapping each other at the place to be welded from outside to such an extent that the adjoining surfaces are brought up to the welding temperature, it is not possible to apply such a method to said artificial materials, because, on the one hand, the heat insulation of these materials is very considerable, and, on the other hand, they are liable to be damaged by high temperatures.

Therefore, it has proved impossible to effect a lap welding for forming hems on such cloth strips with the means known hitherto, so that it has been necessary to find new ways for accomplishing this object.

The present invention proposes to weld said portions of thermoplastic materials of the type mentioned above in such a manner that the surfaces to be joined are brought into contact with heating bodies, or are moved closely past the latter so as to soften the surface layers, and are then pressed together.

In applying this method, the portions to be joined are preferably moved so as to continuously pass along both sides of a fixed heating body shaped according to the curvature of the partial surfaces, whereupon the softened surfaces are pressed together.

In this manner there is developed a method of producing seam joints on cloth sheets of thermoplastic substances, which method, apart from obviating said drawbacks, has the special advantage that the assembling of such cloth sheets into clothes and similar articles may be effected by means of a device operating similarly to a sewing machine and, therefore, being readily developable out of suitable types of sewing machines.

The adjoining surfaces of the cloth edges to be connected are heated so as to soften the surface layers and are then pressed together. This may preferably be effected by guiding the cloth edges through two pressing rollers along both sides of a heating body in contact with the flanks of the latter.

This new seam forming method makes it possible to securely connect overlapping edges of two cloth sheets made of thermoplastic artificial materials without a welding seam or bead, and without using a welding rod. Since, according to the new method, the action of the heat may be strictly limited to the surfaces overlapping each other, any damaging of the material will be prevented; the particular shaping of the surface by a pattern as well as the gloss are completely maintained.

An important advantage of the new method also consists in the fact that, in contradistinction to the hitherto used heating means, it is possible to very accurately regulate the heating temperature according to requirement.

The device for carrying out this method of forming seams will preferably comprise two rotating feed rollers elastically pressed together, and a stationary wedge-shaped heating body projecting into the wedge-shaped space formed between the feed rollers on the entrance side.

These feed rollers, or at least one of them, are positively driven and should be adjustable towards each other in order to facilitate the connection of cloth sheets of different thicknesses. For forming narrow seams or hems, it may be advisable to shift one of the pair of feed rollers with respect to the other roller in axial direction so that the overlapping surface is not wider than the hem connecting the cloth strips. For this purpose, the rollers partly overlapping each other should be shiftable in axial direction with respect to each other so as to permit an adjustment to seams of different widths.

In order to avoid missing seams, the supports of the feed rollers may be provided with adjustable stop ledges for the edges of the cloth sheets to be connected. The heating body should be equipped with means for regulating its temperature, and it is also advisable to provide means for adjusting the operating position of the heating body or of its support.

Furthermore, there should be provided control means for shifting the heating body into or out of its operating position, and finally, in order to be able to interrupt the seam forming operation when required, the control means of the heating body may be coupled with the control means of the feed roller drive so as to enable the heating body and the feed rollers to be jointly shifted into or out of their operating positions.

Of course, the method described above may serve, apart from forming seams and hems at the edges of cloth sheets, also for welding other articles, such as, for example, plate-shaped pieces.

For this purpose, the plates to be connected are guided at an angle with respect to each other, the opposing surfaces being heated by a heating body projecting into the wedge-shaped space formed between said surfaces, which heating softens the surface layers, whereupon the plates are pressed together.

Figure 2:
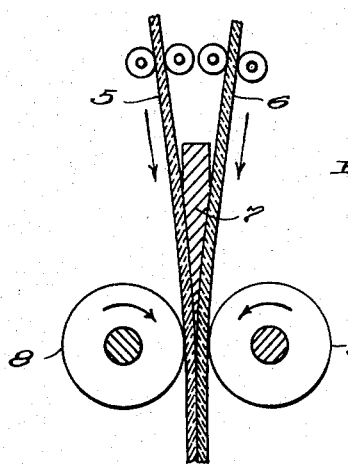
Figure 3:
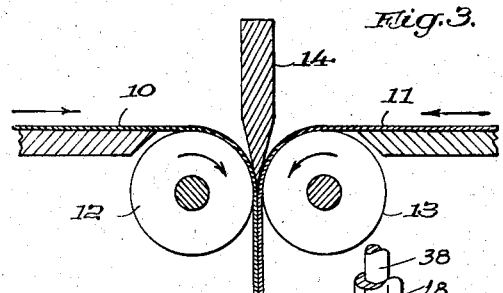
Figure 7:
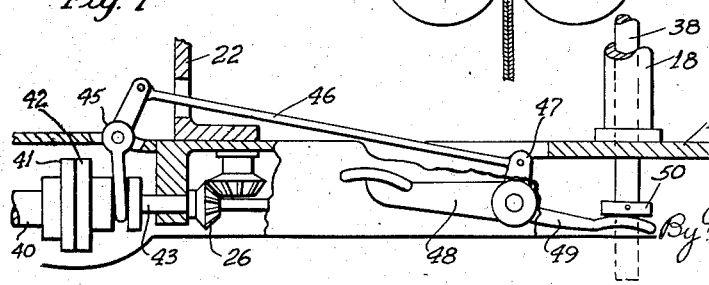

The method of connecting various kinds of articles consisting of polymerizates as well as a special device for carrying out said method are illustrated by way of example in the accompanying drawings, in which:

Fig. 1 shows the invention as applied to adhering the abutting ends of rigid bodies;

Fig. 2 shows the invention as applied to joining the adjacent flat surfaces of relatively rigid panels, Fig. 3 shows the invention as applied to joining the adjacent flat surfaces of flexible sheets and the like, Fig. 4 is a vertical longitudinal section taken on line A—B of Fig. 5 of the preferred form of the novel mechanism for carrying out the method of adhering cloth sheets, Fig. 5 is a top plan view of the same device, Fig. 6 is a side elevation, enlarged, of the heating element and associated parts and Fig. 7 is a side elevation partly in section of the common control for the mechanism illustrated in Figs. 4, 5 and 6.

Fig. 1 illustrates the connection of two rigid bodies 1, 2 consisting of polymerizates and having smooth connecting surfaces. Between these there are inserted electric heating elements 3, 4, which heat the surface layers of the connecting surfaces until they get soft. After rapidly withdrawing the heating elements 3, 4, the bodies 1, 2 are pressed together and are thereby securely connected with each other. The bodies 1, 2 may also have uneven, stepped, or curved connecting surfaces, to which the shape of the heating element is adapted. It is also possible to withdraw the bodies 1, 2 from the heating elements 3, 4, or both parts are moved apart. Moreover, only one of the two opposing surfaces of the bodies 1, 2 might be heated.

According to Fig. 2, two plate-shaped parts 5, 6 are guided at an angle towards each other, their opposing surfaces being heated by a heating element 7 projecting into the wedge-shaped space formed between the parts 5, 6, and softening their opposing surfaces, whereupon said parts are pressed together, for example by means of rollers 8, 9, for rotating in opposite angular directions as indicated by the arrows.

Fig. 3 shows two cloth sheets 10, 11, which are guided over rollers 12, 13, rotating in opposite directions, so as to pass along a wedge-shaped heating element 14 projecting into the space formed between said rollers. In this case too, the outer or opposing surfaces of the cloth sheets are heated and softened, and immediately thereafter they are pressed together by means of the rollers.

Figs. 4 to 6 show a constructional example of a device for carrying out said method. The pressing rollers 12, 13 are arranged on a divided table board 15, 16 supported by a frame 17, 18, 19. The rollers 12, 13 are axially displaced with respect to each other, that is, the end of one roller lies between the end planes of the other roller, so that the rollers oppose each other only at the seam-shaped connecting place of the overlapped cloth sheets 20, 21, and the like guided over the rollers. One of the rollers 12 is freely supported by a vertical standard arm 22, which makes it possible to produce tubular articles, such as sleeves of clothes, legs of trousers, and the like, which, when being connected, are drawn over the arm 22. The other roller 13 is shiftably guided in a horizontal plane on a slide 23 and is pressed against the roller 12 by means of a spring 24. A screw 25 serves to regulate the distance between the rollers 12, 13 for working sheets of different thicknesses. Owing to the elastic bearing, the roller 13 will yield to unevennesses of the seam and when passing over transverse seams. The rollers 12, 13 are driven by means of bevel wheels 26, 27, 28, 29, and 30 with equal velocities, a large free space 31 for receiving the ready worked cloth parts being left by passing the gear round to the right hand side of the table below the table board 16. Abutments 32, 33 serve as stops for the edges of the cloth sheets 20, 21, and the like, one of which abutments is adjustable in order to make it possible to alter the width of the seam. The wedge-shaped heating element 14 has an offset cylindrical casing 14' which is strapped to a bar 34 and a support 35, respectively shiftable in vertical direction on rods 36. The rods 36 are pivoted to a lug 60 on the table 16 for rocking motion about the pintles 61 forming hinged connections 39. The support 35 is provided with sockets 62 adapted to receive the rods 36 to form a sliding connection to permit the heating element 14 to be raised from the rollers 12 and 13 by means of the pedal 48 and rod 38. Therefore, the heating element can freely adjust itself to the respective centre of the seam with cloths of different thicknesses. When the roller 13 is shifted, the bevel wheel 30 slides along its grooved shaft 37, so as to drive the roller 13 in any position. The support 35 is moved up and down by means of rods 38, for example with the aid of a pedal or the like, so that, in case of need, the support 35 may be drawn out in an upward direction. The drive of the rollers 12, 13 is preferably also adapted to be coupled and uncoupled by means of a pedal or the like so as to prevent the cloth sheets from being damaged if they do not move when the heating element is lowered. Advantageously the drive of the rollers is coupled with the pedal for raising and lowering the holder 35 so as to be automatically thrown on when the heating element 14 is lowered, and thrown off when the latter is raised.

For this purpose, as indicated in Fig. 7, the main driving shaft 40 may have a clutch disk 41 mounted thereon for engagement with the slidable clutch disk 42 on the countershaft 43 which drives the bevel gears 26, 27. A shift fork 45 for the clutch disk 42 is connected by a link 46 to a bell crank 47 having an arm 49 engaged with a collar 50 on the rod 38. A pedal extension 48 is connected to the bell crank 47 so that depression of the pedal causes a lifting of rod 38 and therewith of the heating element 14, and also causes a disengagement of the clutch disks 41, 42; while a release of the pedal 48 causes the weight of the heating element and its support to bring the same into the lowered position as determined by engagement of the rods 36 with the table board 16, and also to engage the clutch disks 41, 42.

The new device serves to work straight and curved seams, in which latter case the respective cloth parts are moved in a curve on the table boards 15, 16.

What is claimed, is:

1. A device for adhering plies of thermoplastic materials, comprising a frame, two rotatable rollers mounted on the frame, a wedge-shaped heating element positioned in alinement with the entrance side of the rollers into the wedge-shaped space formed by said rollers for contact with the opposed surfaces of the plies, and a support carried by the frame for positioning said element and including pivot means about which the heating element may be rocked in a plane parallel to the axes of the rollers.

2. A device for adhering flexible plies of thermoplastic materials, comprising a frame, two rotatable rollers mounted on the frame, means for positively driving at least one of said rollers, a heating element having a wedge-shaped portion for presentation at the entrance side of the rollers into the wedge-shaped space formed by the said rollers, and means for simultaneously disconnecting the driving means and moving the said wedge-shaped portion out of said space.

3. A device for adhering flexible sheets of thermoplastic materials, comprising a frame, a first horizontal table on said frame, a second horizontal table on the frame spaced from the first table, two rotatable feed rollers positioned opposite the gap between the tables, means for positively driving said rollers at the same peripheral speed in opposite directions, a wedge-shaped heating element and means for supporting the same in the wedge-shaped space formed by and above the rollers, stop ledges for guiding the sheets in their movement along the tables and between the rollers, and means for simultaneously disengaging the driving means and raising the heating element.

J. CÜSTERS.